United States Patent
Bao

(10) Patent No.: US 10,834,341 B2
(45) Date of Patent: Nov. 10, 2020

(54) SYSTEMS AND METHODS FOR SIMULTANEOUS CAPTURE OF TWO OR MORE SETS OF LIGHT IMAGES

(71) Applicant: Baidu USA, LLC, Sunnyvale, CA (US)

(72) Inventor: Yingze Bao, Mountain View, CA (US)

(73) Assignee: Baidu USA LLC, Sunnyvale, CA (US)

(*) Notice: Subject to any disclaimer, the term of this patent is extended or adjusted under 35 U.S.C. 154(b) by 412 days.

(21) Appl. No.: 15/844,174

(22) Filed: Dec. 15, 2017

(65) Prior Publication Data
US 2019/0191108 A1   Jun. 20, 2019

(51) Int. Cl.
*H04N 5/33* (2006.01)
*H04N 9/04* (2006.01)
*G02B 5/20* (2006.01)

(52) U.S. Cl.
CPC ......... *H04N 5/332* (2013.01); *H04N 9/04553* (2018.08); *G02B 5/201* (2013.01); *G02B 5/208* (2013.01)

(58) Field of Classification Search
CPC ........ H05K 9/009; H05K 9/0098; D04C 1/08; D10B 2505/12; D10B 2505/00; D10B 2401/16
See application file for complete search history.

(56) References Cited

U.S. PATENT DOCUMENTS

| 3,971,065 A | 7/1976 | Bayer |
| 2010/0295947 A1 | 11/2010 | Boulanger |
| 2015/0312556 A1 | 10/2015 | Cho |

(Continued)

FOREIGN PATENT DOCUMENTS

| CN | 202721743 U | 2/2013 |
| CN | 104937928 A | 9/2015 |
| CN | 104822033 A | 9/2017 |

(Continued)

OTHER PUBLICATIONS

Search Report and Written Opinion dated Jun. 3, 2020, in Chinese Patent Application No. CN 201810959132.5A, and the Machine Translation. (19 pgs).

(Continued)

*Primary Examiner* — David P Porta
*Assistant Examiner* — Meenakshi S Sahu
(74) *Attorney, Agent, or Firm* — North Weber & Baugh LLP

(57) ABSTRACT

Described herein are systems and methods that provide effective way for simultaneous capture of infrared and non-infrared images from a single camera. In embodiments, a filter comprises at least two types of filters elements: (1) an infrared filter type that allows infrared light to pass through the filter element; and (2) at least one non-infrared filter type that allows light in a visible spectrum range or ranges to pass through the filter element. In embodiments, the filter elements form a pattern of the infrared filter elements and the non-infrared filter elements and is positioned relative to a camera's array of sensor cells to form a correspondence between sensor cells and filter elements. In embodiments, signals captured at the camera's sensor cells may be divided to form an infrared image and a visible light image that were captured simultaneous, which images may be used to determine depth information.

20 Claims, 10 Drawing Sheets

(56) References Cited

U.S. PATENT DOCUMENTS

2018/0041718 A1\* 2/2018 Price .................... G01S 7/4816

FOREIGN PATENT DOCUMENTS

CN           104463112 A     4/2018
JP           2006210701 A     8/2006

OTHER PUBLICATIONS

Alhwarin et al.,"IR Stereo Kinect: Improving Depth Images by Combining Structured Light with IR Stereo," Mobile Autonomous Systems & Cognitive Robotics Institute, FH Aachen University of Applied Sciences, Aachen, Germany, 2014. (9 pgs).
Intel RealSense Technology, "Observe the World in 3D," [Online], [Retrieved Jun. 5, 2019]. Retrieved from Internet <URL: https://www.intel.com/content/www/us/en/architecture-and-technology/realsense-overview.html> (6pgs).
Wikipedia, "Kinect," [Online], [Retrieved Jun. 5, 2019]. Retrieved from Internet <URL:https://en.wikipedia.org/wiki/Kinect> (16 pgs).

\* cited by examiner

200

| IR | V | IR | V | IR | V | IR | V | IR | V |
|----|---|----|---|----|---|----|---|----|---|
| V | IR | V | IR | V | IR | V | IR | V | IR |
| IR | V | IR | V | IR | V | IR | V | IR | V |
| V | IR | V | IR | V | IR | V | IR | V | IR |
| IR | V | IR | V | IR | V | IR | V | IR | V |
| V | IR | V | IR | V | IR | V | IR | V | IR |
| IR | V | IR | V | IR | V | IR | V | IR | V |
| V | IR | V | IR | V | IR | V | IR | V | IR |
| IR | V | IR | V | IR | V | IR | V | IR | V |
| V | IR | V | IR | V | IR | V | IR | V | IR |

SYSTEMS AND METHODS FOR SIMULTANEOUS CAPTURE OF TWO OR MORE SETS OF LIGHT IMAGES

BACKGROUND

A. Technical Field

The present disclosure relates generally to systems and methods for image processing; and more particularly deals with system and methods for simultaneously capturing visible and infrared light images.

B. Background

A typical digital camera includes a lens, a light filter, and an imaging sensor. The light filter determines which light band or bands the sensor capture. For example, an active depth camera uses an infrared-pass filter so only the infrared light emitted from the active device is captured. Such a camera or set of cameras are often used to recover the three-dimensional (3D) depth of a scene within the field of view of the camera. By way of another example, an infrared-deny filter may be used for a regular red-green-blue (RGB) camera to improve the quality of a captured image by reducing interference caused by infrared light.

To solve many computer vision tasks, such as three-dimensional reconstruction, structure from motion, visual simultaneous location and mapping (SLAM), face recognition, scene understanding, and the like, both the depth image and the regular image are useful inputs. Traditionally, depth images and regular images have been captured by two different physical cameras or two different sets of sensors.

However, it is expensive to use multiple cameras. Having two or more cameras means that there is duplication of a number of components, which adds costs. Furthermore, using multiple cameras carries additional overhead costs associated with set-up and use. For example, it is not easy to calibrate and align the two camera images. Furthermore, due to variations and limitations on the manufacture and assembly processes, there are always differences between cameras. For example, camera components, such as the lens and camera sensors can vary both in their responses and in physical installation within the camera. As a result, the intrinsic parameters are different for every camera. Thus, camera intrinsic parameter calibration is an important process. Thus, the complexity involved in current methods make configuring and using such multi-camera imaging systems difficult, time-consuming, and expensive.

Accordingly, what is needed are systems and methods that can improve the process of capturing images and mitigate the camera alignment problem (i.e., aligning a depth image and a regular image).

BRIEF DESCRIPTION OF THE DRAWINGS

References will be made to embodiments of the inventions, examples of which may be illustrated in the accompanying figures. These figures are intended to be illustrative, not limiting. Although the inventions are generally described in the context of these embodiments, it should be understood that it is not intended to limit the scope of the inventions to these particular embodiments. Items in the figures may not be to scale.

Figure ("FIG.") 1 depicts an example camera system, according to embodiments of the present document.

FIG. 2 depicts an example of a dyadic or bipartite filter, accordance with embodiments of the present document.

DETAILED DESCRIPTION OF EMBODIMENTS

Figure 1:
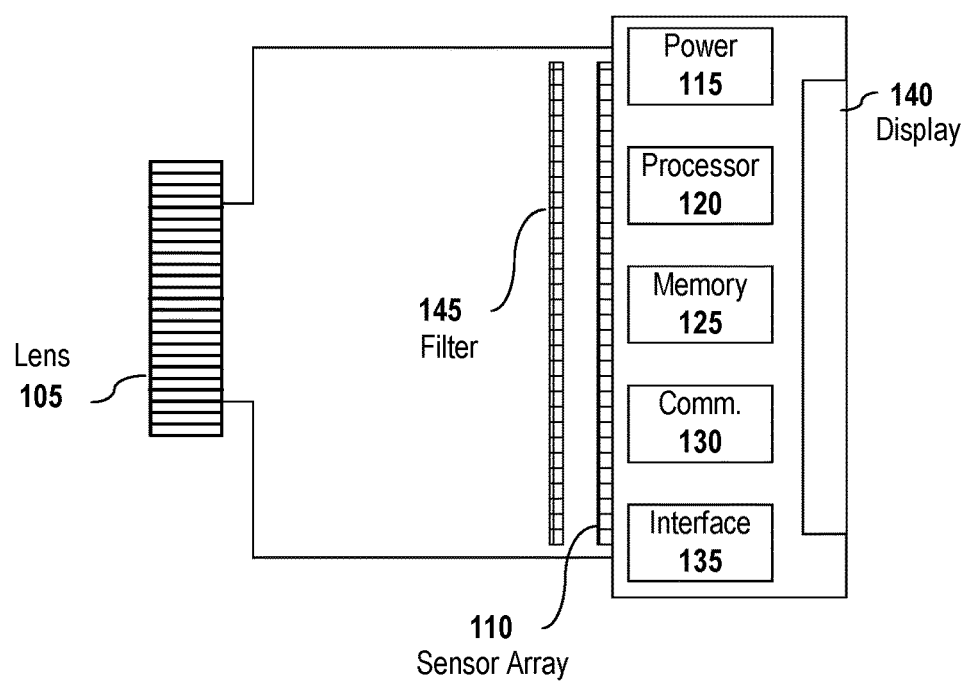
FIG. 1 depicts an example camera system or imaging device 100 according to embodiments of the present disclosure.

In the following description, for purposes of explanation, specific details are set forth in order to provide an understanding of the inventions. It will be apparent, however, to one skilled in the art that the inventions can be practiced without these details. Furthermore, one skilled in the art will recognize that embodiments of the present inventions, described below, may be implemented in a variety of ways, such as a process, an apparatus, a system, a device, or a method on a tangible computer-readable medium.

Components, or modules, shown in diagrams are illustrative of exemplary embodiments of the inventions and are meant to avoid obscuring the inventions. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "one or more embodiments," "preferred embodiment," "an embodiment," or "embodiments" means that a particular feature, structure, characteristic, or function described in connection with the embodiment is included in at least one embodiment and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. It shall also be understood that the terms "image" or "images" as used herein shall mean still images, video images, or both.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. General Overview

As previously noted, to solve many computer vision tasks, such as three-dimensional reconstruction, structure from motion, visual simultaneous location and mapping (SLAM), face recognition, scene understanding, and the like, both the depth image and the regular image are useful inputs. Traditionally, depth images and regular images have been captured by two different physical cameras or two different sets of sensors. When two or more cameras are present in the system, the intrinsic parameters as well as the geometric relationship between the cameras is obtained, which adds to the overhead costs of configuring and using such a system.

Some depth cameras enclose both a depth camera and a regular camera in the same physical device, thereby a user obtains both the RGB image and the depth image by using a composite device. However, such systems have drawbacks. First, they are expensive because two cameras are still being used. Second, even though the two cameras may be in or attached to one physical enclosure, the fact remains that there are two cameras, which means they will need to be calibrated accordingly, as discussed previously. The calibration process, such as the camera extrinsic calibration process, can be time consuming. Finally, a two-cameras-in-a-single-enclosure device must maintain rigidity of the structure between the two cameras, which adds to the device's weight and costs.

Other approaches try using algorithmic methods to recover depth from a single regular camera. However, these algorithmic-only approaches also have drawbacks. First, the quality of the depth information tends to be inferior compared to a dedicated depth camera. And second, the computation usually requires expensive specialized equipment, such as a specialized system on a chip (SoC), to perform the calculations.

Embodiments presented herein provide systems and methods that overcome the drawbacks noted above, thereby making it easier and more effective process to simultaneously capture visible light and non-visible light images in an imaging system.

B. System Embodiments

1. Camera System Embodiments

FIG. 1 depicts an example camera system or imaging device 100 according to embodiments of the present disclosure. The camera 100 comprises one or more lens 105 for focusing an image onto an image sensor array 110 and includes a filter 145, which filters types of light that may be received at the image sensor array 110.

The image sensor array 110 may be a semiconductor device, such as a charge coupled device (CCD) sensor array or complementary metal oxide semiconductor (CMOS) sensor array, or other sensor device or devices for capturing images. In embodiments, the image sensor array 110 is communicatively coupled to a processor 120 (which may be one or more integrated circuits, application specific integrated circuit(s), and/or system(s) on a chip) for processing the image captured by image sensor array.

In embodiments, the filter 145 is unlike typical camera filters, which are designed to for a specific light frequency range. A traditional filter may be a band-pass filter, which allows a certain range of light through the filter, or the filter may be a notch filter, which blocks a certain range of light. These ranges, whether for a band-pass filter or a notch filter, may be broad or narrow, but it is always the same for the entire filter. That is, the traditional filter allows or denies, depending upon whether it is a band-pass filter or a notch filter, the same light for the entire filter. In contrast to traditional filters, the filter 145 is a multipartite filter that allows or blocks at least two distinct types of light at different position in the filter. Thus, the light incident on the sensor array is likewise distinct.

In one or more embodiments, the filter 145 may comprise a plurality of cells or elements that are configured to filter specific light. In one or more embodiments, the filter is positioned such that each filter element of the filter corresponds in a one-to-one registration with the sensor cells of the sensor. Thus, in one or more embodiments, the number of cells in the filter corresponds to the number of sensor arrays in the sensor (i.e., the image sizes), such as 640×480, 1280×960, etc., although other filter array sizes and configurations may be used. Alternatively, in one or more embodiments, the sensor array may have higher resolution than the filter elements, such that a filter element correspond to more than one sensor cell. In any event, the filter element's type decides what type of light, or spectrum of light, can reach the sensor cell or cells during the exposure process of imaging, which eventually provides the value for a pixel or pixels in the image.

Figure 3:
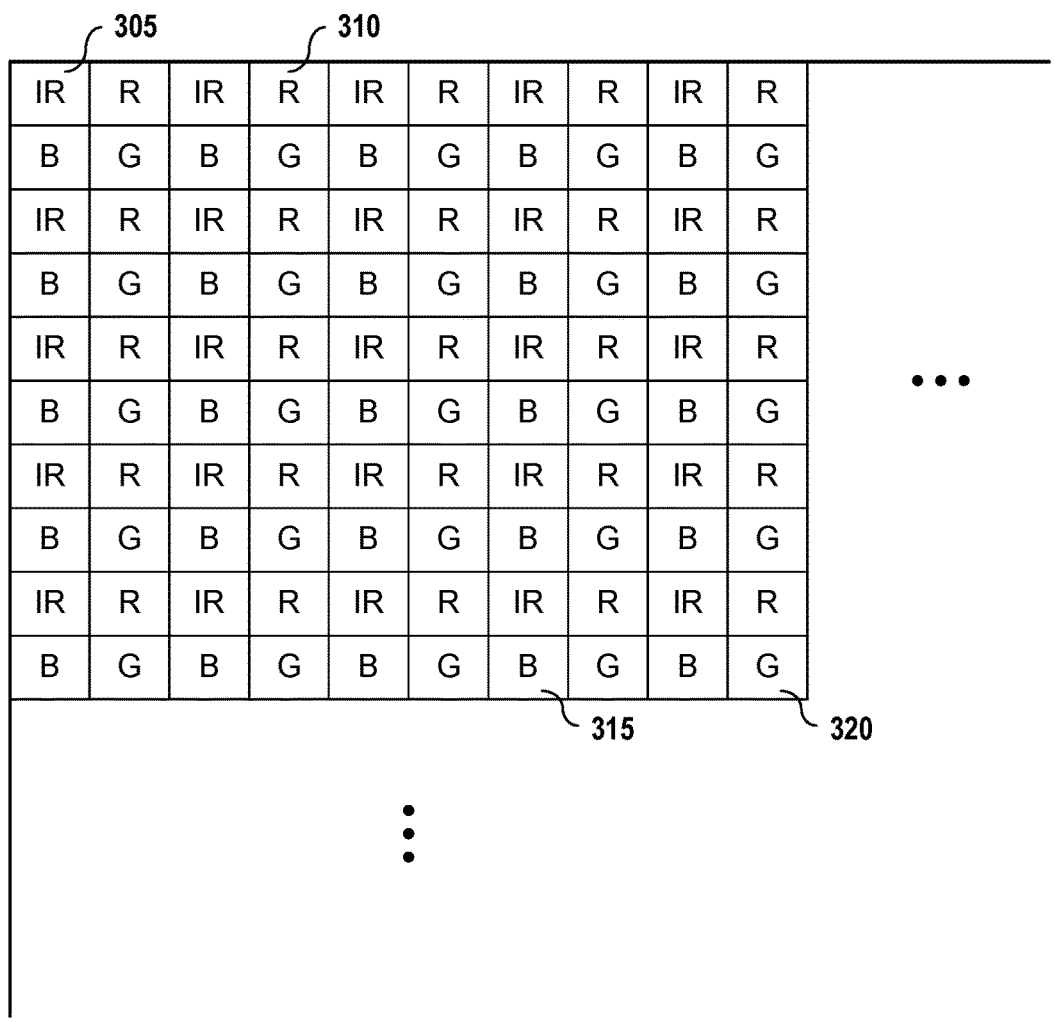
FIG. 3 depicts an example of a quadripartite filter, according to embodiments of the present document.

Consider by way of illustration the example filters depicted in FIGS. 2 and 3. FIG. 2 depicts an example of a dyadic or bipartite filter, accordance with embodiments of the present document. As shown in FIG. 2, the filter 200 comprises two distinct types of filter elements—one set of elements for infrared (IR) light (e.g., filter cell 205) and one set of elements for visible (V) light (e.g., filter cell 210). The two elements are configured in a repeating patterns and alternating rows. As shown in the depicted embodiment in FIG. 2, the filter 200 comprises a plurality of rows; and a row comprises a repeated pattern of an infrared filter element and a non-infrared filter element, and filter elements of the same type are not aligned in consecutive rows. Thus, the pattern forms a checkerboard-like pattern.

Furthermore, the filter is positioned relative to the sensor array such that the sensor cell or cells correspond to and receive light from a filter element that is in front of it. A result of using a filter 200 such as the one depicted in FIG. 2 is that the sensor array will have simultaneously taken two images of the same scene—one IR image and one visible light (grayscale) image.

FIG. 3 depicts another filter, in this case an infrared and red-green-blue filter, according with embodiments of the present document. As illustrated in FIG. 3, in one or more embodiments, the filter 300 may comprise a set of alternating rows—a row comprising a repeated pattern of an infrared filter element and a non-infrared filter element of a first type, and a row comprises a repeated pattern of a non-infrared filter element of a second type and a non-infrared filter element of a third type. Thus, in one or more embodiments, the filter 300 comprises four distinct types of filters: a set of infrared filters (e.g., filter cell 305), a set of red filters (e.g., filter cell 310), a set of blue filters (e.g., filter cell 315), and a set of green filters (e.g., filter cell 320). It should be noted, in one or more embodiments, that number of each type of filter cell need not be uniform. For example, colors to which the human eye is more sensitive (e.g., green) may have more filter elements in the filter 300 than other colors (such as blue or red). A result of using a filter 300 such as the one depicted in FIG. 3 is that the sensor array will effectively have simultaneously taken two images of the same scene—one IR image and one visible light (color) image.

It shall be noted that the filters depicted in FIGS. 2 and 3 are only examples. One skilled in the art shall recognize that cells may have different geometries, different patterns, different configurations, select for different wavelengths, etc.

Returning to FIG. 1, in embodiments, the camera may also comprise addition components, including but not limited to a power source 115, one or more permanent and/or removable memories or storage device 125 for use by the processor to store data temporarily, permanently, or both, one or more communications modules 130 to support communications (wired, wireless, or both) to one or more other devices, a display 140 for displaying images and/or menu items to a user, and an interface module or modules 135 for receiving input from a user via one or more button and/or via display 140, if the display is a touch-sensitive display. One skilled in the art shall recognize that camera system 100 may also include additional items, such as image encoders and other items, which are not depicted in FIG. 1. It should be noted that embodiments of the present inventions may be utilized with any device that is or comprises an imaging device, including, but not limited to, digital cameras, video cameras, mobile phones, computers, and the like. It also should be noted that camera system 100 may be differently configured and include different components, including fewer or more components than depicted in FIG. 1.

2. Computing System Embodiments

In embodiments, aspects of the present inventions may utilize, may include, or may be implemented on one or more information handling systems/computing systems, which may be used with or incorporated into or with a camera system 100. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 4:
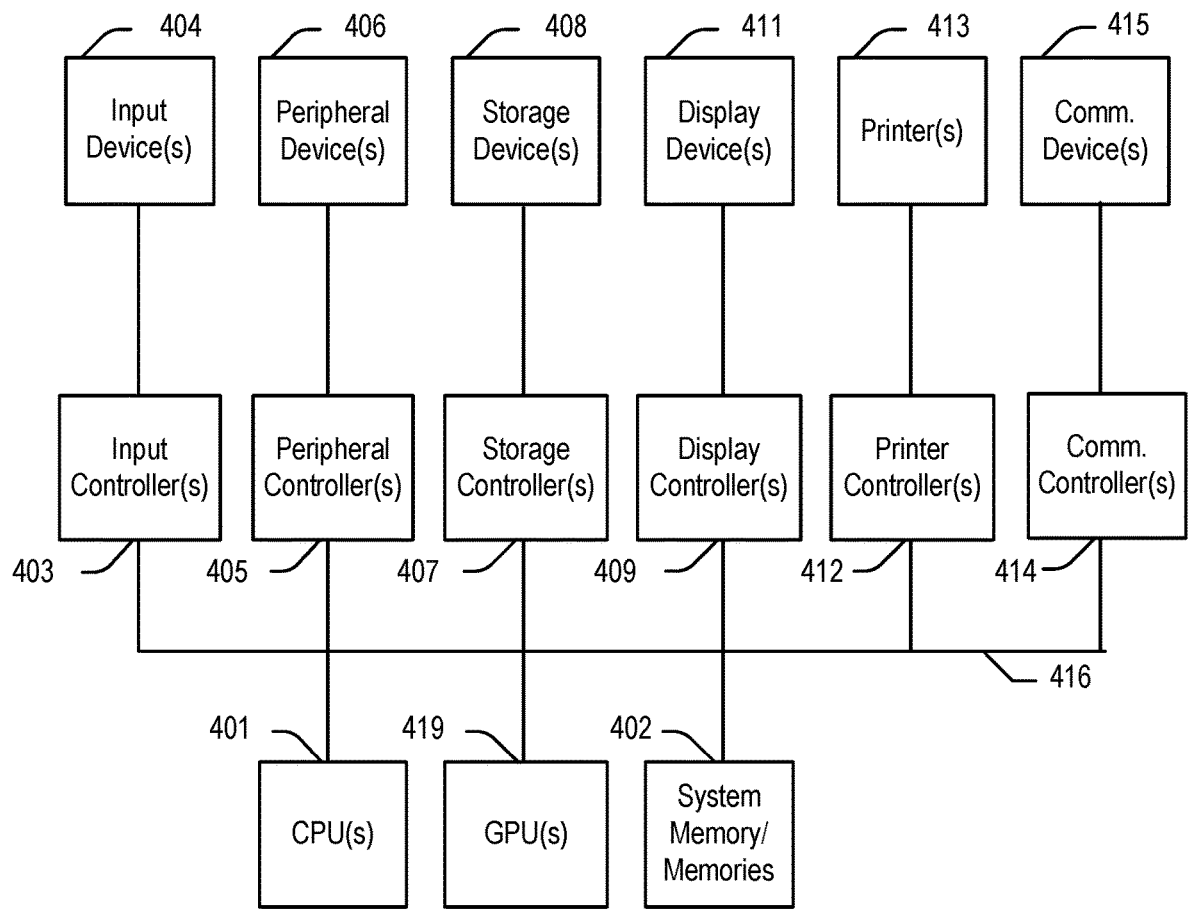
FIG. 4 depicts a simplified block diagram of a computing device/information handling system (or computing system) according to embodiments of the present disclosure.

FIG. 4 depicts a simplified block diagram of a computing device/information handling system (or computing system) according to embodiments of the present disclosure. It will be understood that the functionalities shown for system 400 may operate to support various embodiments of a computing system—although it shall be understood that a computing device may be differently configured and include different components, including fewer or more components depicted in FIG. 4.

As illustrated in FIG. 4, the computing system 400 includes one or more central processing units (CPU) 401 that provides computing resources and controls the computer. CPU 401 may be implemented with a microprocessor or the like, and may also include one or more graphics processing units (GPU) 419 and/or a floating-point coprocessor for mathematical computations. System 400 may also include a system memory 402, which may be in the form of random-access memory (RAM), read-only memory (ROM), or both.

A number of controllers and peripheral devices may also be provided, as shown in FIG. 4. An input controller 403 represents an interface to various input device(s) 404, such as a keyboard, mouse, touchscreen, and/or stylus. There may also be a scanner controller (not shown), which communicates with a scanner (not shown), which may be used to received scanned images. The system 400 may also include a storage controller 407 for interfacing with one or more storage devices 408, each of which includes a storage medium, such as magnetic tape or disk, or an optical medium that might be used to record programs of instructions for operating systems, utilities, and applications, which may include embodiments of programs that implement various aspects of the present inventions. Storage device(s) 408 may also be used to store processed data or data to be processed in accordance with the inventions. The system 400 may also include a display controller 409 for providing an interface to a display device 411, which may be a cathode ray tube (CRT), a thin film transistor (TFT) display, organic light-emitting diode, electroluminescent panel, plasma panel, or other type of display. The computing system 400 may also include one or more peripheral controllers or interfaces 405 for one or more peripherals 406. The peripherals may include one or more printers, mobility system (which may include one or more motors, servo units, etc.), inertial measurement units, vision systems (which may include one or more cameras), sensors, etc. A communications controller 414 may interface with one or more communication devices 415, which enables the system 400 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 416, which may represent more than one physical bus. However, various system components may or may not be in physical proximity to one another. For example, input data and/or output data may be remotely transmitted from one physical location to another. In addition, programs that implement various aspects presented herein may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present inventions may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present inventions may further relate to computer products with a non-transitory, tangible computer-readable medium that have computer code thereon for performing various computer-implemented operations. The media and computer code may be those specially designed and constructed for the purposes of the present inventions, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present inventions may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present inventions. One skilled in the art will also recognize that a number of the elements described above may be physically and/or functionally separated into sub-modules or combined together.

3. Depth and Visual Image Capture Method Embodiments

Figure 5:
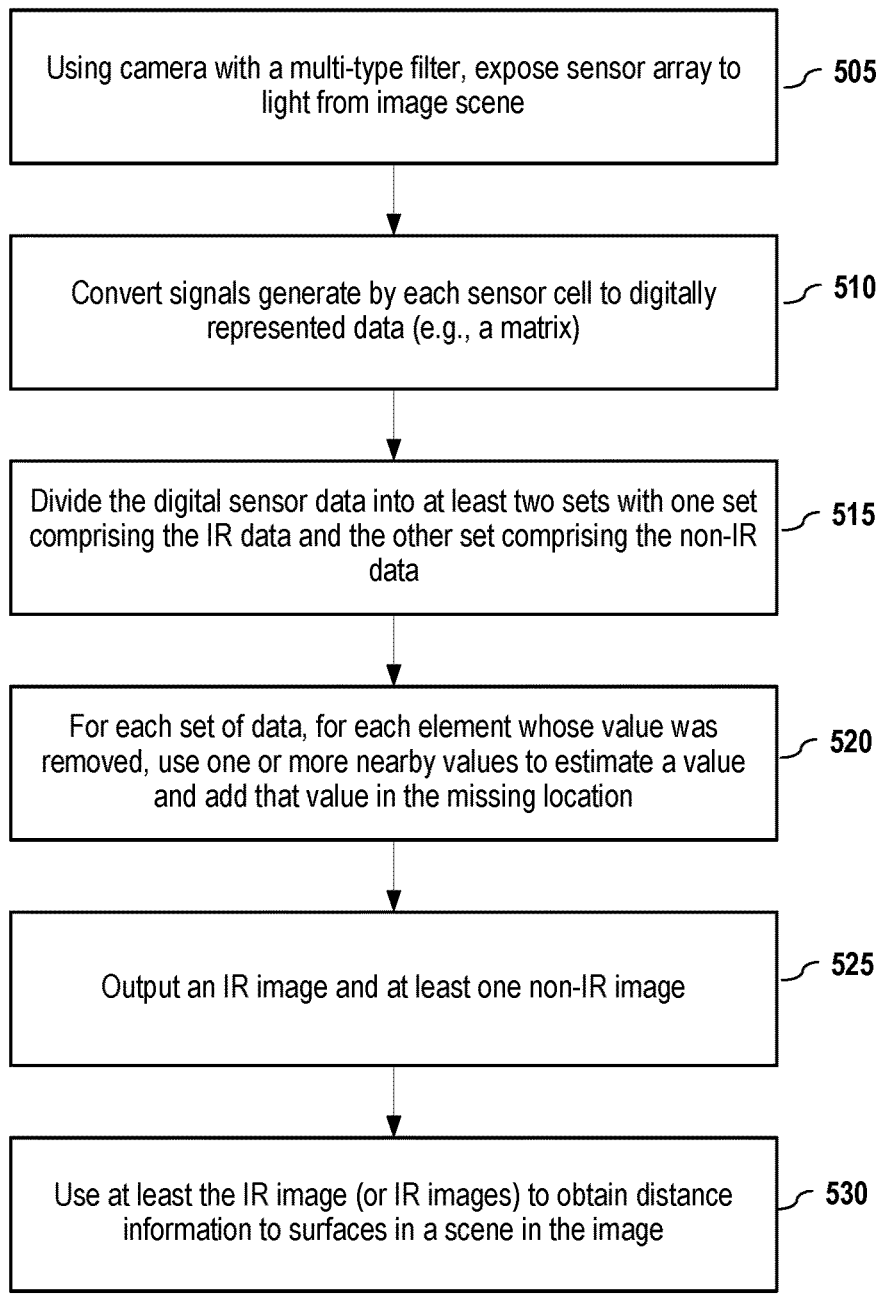
FIG. 5 depicts a method for the simultaneous capture of a visible light and a non-visual light image, according to embodiments of the present document.

FIG. 5 depicts a method for the simultaneous capture of a visible light and a non-visual light image, according to embodiments of the present document. In one or more embodiments, a camera with a multipartite filter is used (505) to expose the sensor array to light from an image scene. In embodiments, the filter may comprise filter elements for infrared light and for visible light, such as one depicted in FIG. 2 or FIG. 3. Having exposed the sensor array of the camera to light from the image scene, the signals generate by each sensor cell, or element, are converted (510) into digitally represented data. For example, the light signals for the sensor array may be converted into a matrix of values corresponding to the sensor array. Since the camera used a filter with at least two different filter element types (e.g., either IR and visible light filters, or IR and red, green, and blue filter elements), the initial digital sensor values be divided (515) into at least two sets with one set comprising the IR data and the other set comprising the non-IR data—either IR values and visible light (gray) values or IR and red-green-blue values. In one or more embodiments, for each set of data (IR values and visible light values), for each element whose value was removed, one or more nearby values may be used to estimate (520) a value for the missing value location, which estimated value may be added (520) at the missing location in the set of data. For each set of data, when the missing values have been added, the sets of data may be output (525) as an IR image and at least one non-IR image.

Given that there are two images taken with the same camera at the same time using the same sensor array, these two images—an IR image and a visible light image—are aligned. One skilled in the art shall recognize that these images or a set of IR images comprising different projected patterns may be used to obtain (530) distance information to surfaces in a scene in the images.

In embodiments, such an IR image may be used to generate depth information. For example, in embodiments, a pair of such apparatuses may be installed into a single device constituting an IR stereo camera. In such a case, the IR images pair may be used to compute depth information using a stereoscopic methodology, such as block matching—although other methodologies may also be employed. In embodiments, such a device produces, in addition to the IR images, regular gray or RGB images, which may be used for one or more reasons such as object recognition or a video analysis task. In contrast, traditional devices for obtaining IR image pairs and regular images requires at least three imaging sensors. An obvious advantage of embodiments is reducing the number of imaging sensors, and thereby it greatly simplifies the multi-camera calibration problem and reduces hardware cost. Another advantage, as previously noted, is that the IR images and the visible light images are aligned.

Figure 6:
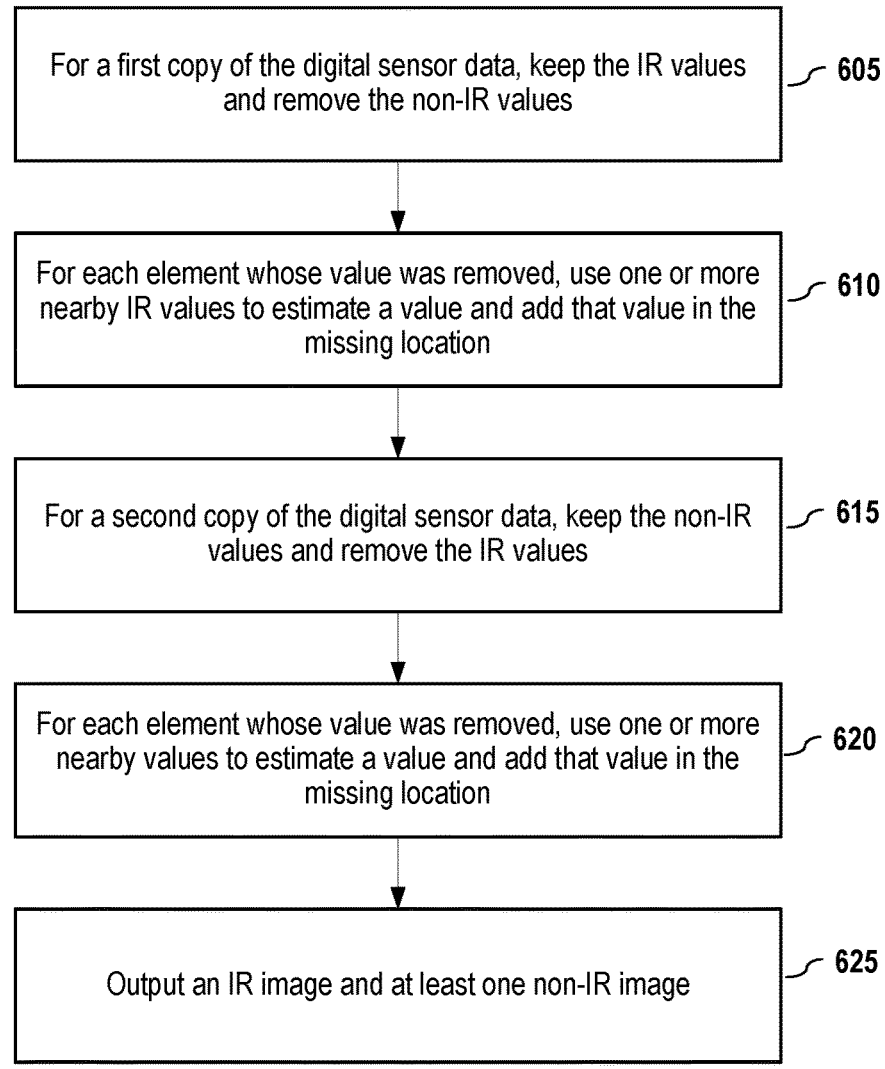
FIG. 6 depicts a methodology that may be used to generate infrared and non-infrared images from the sensor array data, according to embodiments of the present disclosure.

As noted above, the sensor array data may be divided into sets of data based upon filter type and missing values added. FIG. 6 depicts a methodology that may be used to generate infrared and non-infrared images from the sensor array data, according to embodiments of the present disclosure. In one or more embodiments, a first copy of the digital sensor data keeps the IR values and does not copy or removes (605) the non-IR values. For each element whose value was removed or is otherwise missing, one or more nearby IR values may be used (610) to estimate a value and add that value in the missing location.

Similarly, in one or more embodiments, a second copy of the digital sensor data keeps the non-IR values and does not copy or removes (615) the IR values. For each element whose value was removed or is otherwise missing, one or more nearby non-IR values may be used (620) to estimate a value and add that value in the missing location. It shall be noted that for a filter type that has red-green-blue elements, that the method may be extended to generate a separate red image, a separate green image, and a separate blue image, if desired.

Finally, the IR image and non-IR image or images may be output (625).

Figure 7:
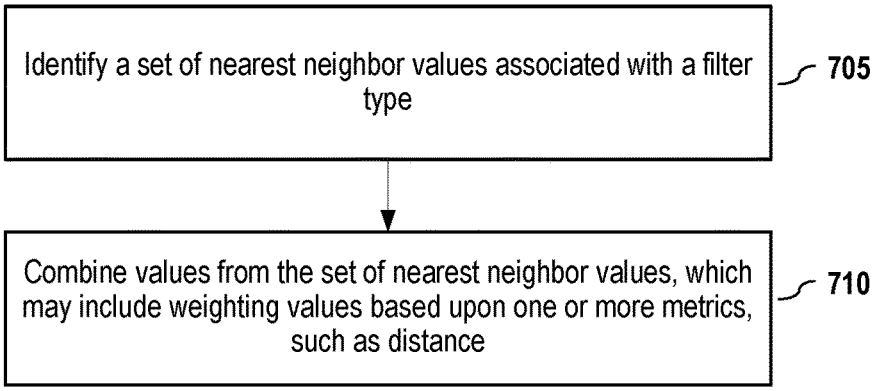
FIG. 7 depicts a methodology for determining a value, according to embodiments of the present document.

One skilled in the art shall recognized that any of a number of methods may be used to estimate missing values. FIG. 7 depicts a methodology for determining a value, according to embodiments of the present document. As illustrated in FIG. 7, a set of nearest neighbor values associated with a filter type, which set may comprise one or more values, may be identified (705). In embodiments, the set of values may then be combined (710) to obtain the missing value. In embodiments, the act of combining may include adding one or more weighting values based upon one or more metrics, such as distance from the missing location, filter time, etc.

Figure 8:
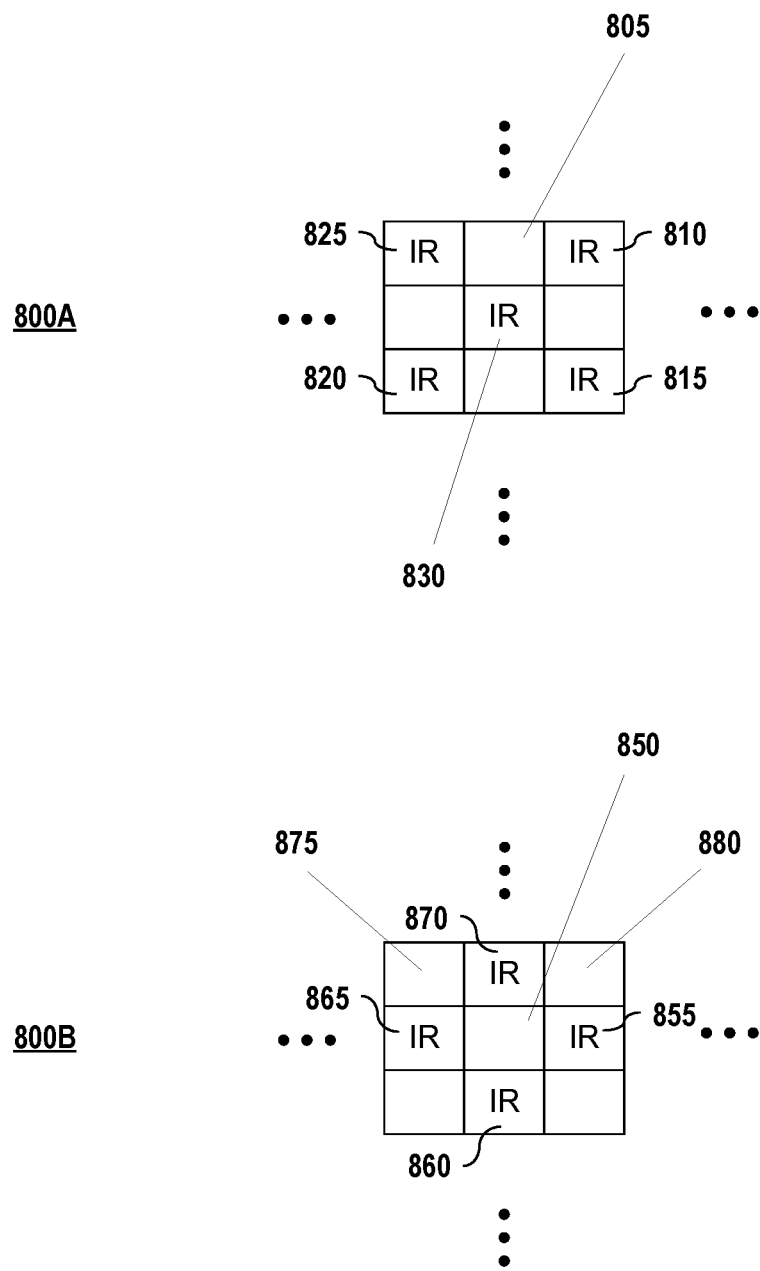
FIG. 8 depicts partial data arrays, according to embodiments of the present document.

Examples of methods to combine include, but are not limited the following. First, in embodiments, the closest value of like filter type may be used. Consider, by way of illustration, the partial data arrays 800x depicted in FIG. 8. To fill the missing location 805 in partial array 800A, a value from the closest filter type may be used. In this example, values for array elements 810, 825, and 830 are each equidistant to 805. Thus, in embodiments, a convention may be set that the value in a certain cardinal position (e.g., left, right, above, or below) relative to the missing value may be used. For example, it may be that the value immediate below the missing value should be copied into the missing location 805, unless it is the bottom of the array and then the value to the right should be used.

Alternatively, in embodiments, the nearest neighbor values may be averaged to obtain the missing value. Considering, by way of example the partial array 800B. The nearest neighbors to the missing location 850 are 855, 860, 865, and 870 within a 3×3 neighborhood of the missing location 850. In embodiments, the values at locations 855, 860, 865, and 870 may be averaged to obtain a value for the missing location 850.

In embodiments, only measured values from the original sensor data may be considered when estimating a missing value (i.e., one or more estimated values are not considered when estimating a missing value). For example, if values for 875 and 880 had been previously estimated, they would, in this embodiment, not be considered. Alternatively, one or more previously estimated values, like values at locations 875 and 880, may be included in estimating the missing value for 850. In embodiments, those values (i.e., values at locations 875 and 880) may be weighted differently for one or more reasons than the values at the other locations (i.e., 855, 860, 865, and 870). For example, those values (i.e., values at locations 875 and 880) may be weighed less due to their being further away (measured center-to-center in the sensor array) than the other locations (i.e., 855, 860, 865, and 870) and/or because they are estimated values rather than measured values.

Figure 9:
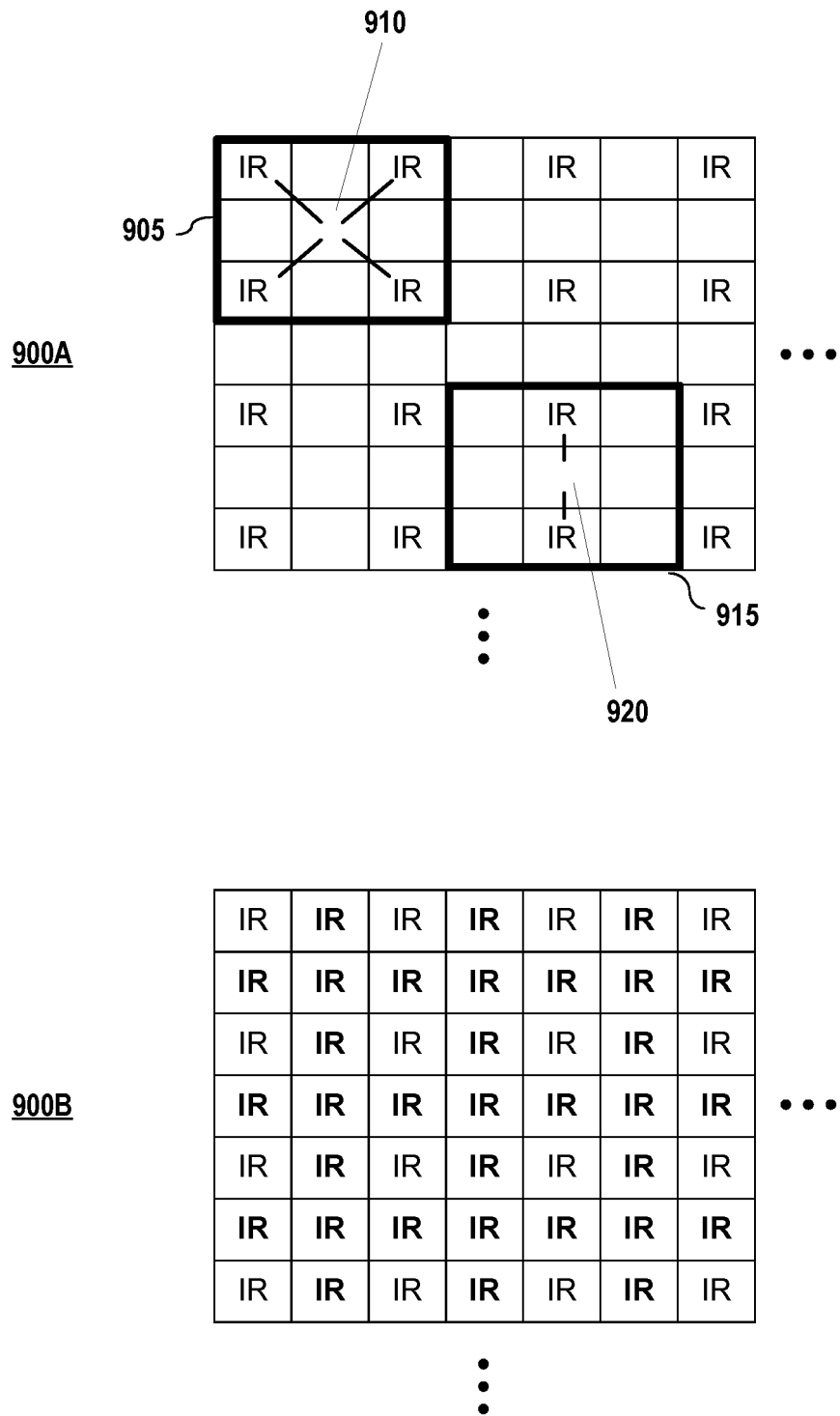
FIG. 9 depict example methods for estimating infrared values that are missing in a data array from a filter pattern like that shown in FIG. 3, according to embodiments of the present disclosure.
Figure 10:
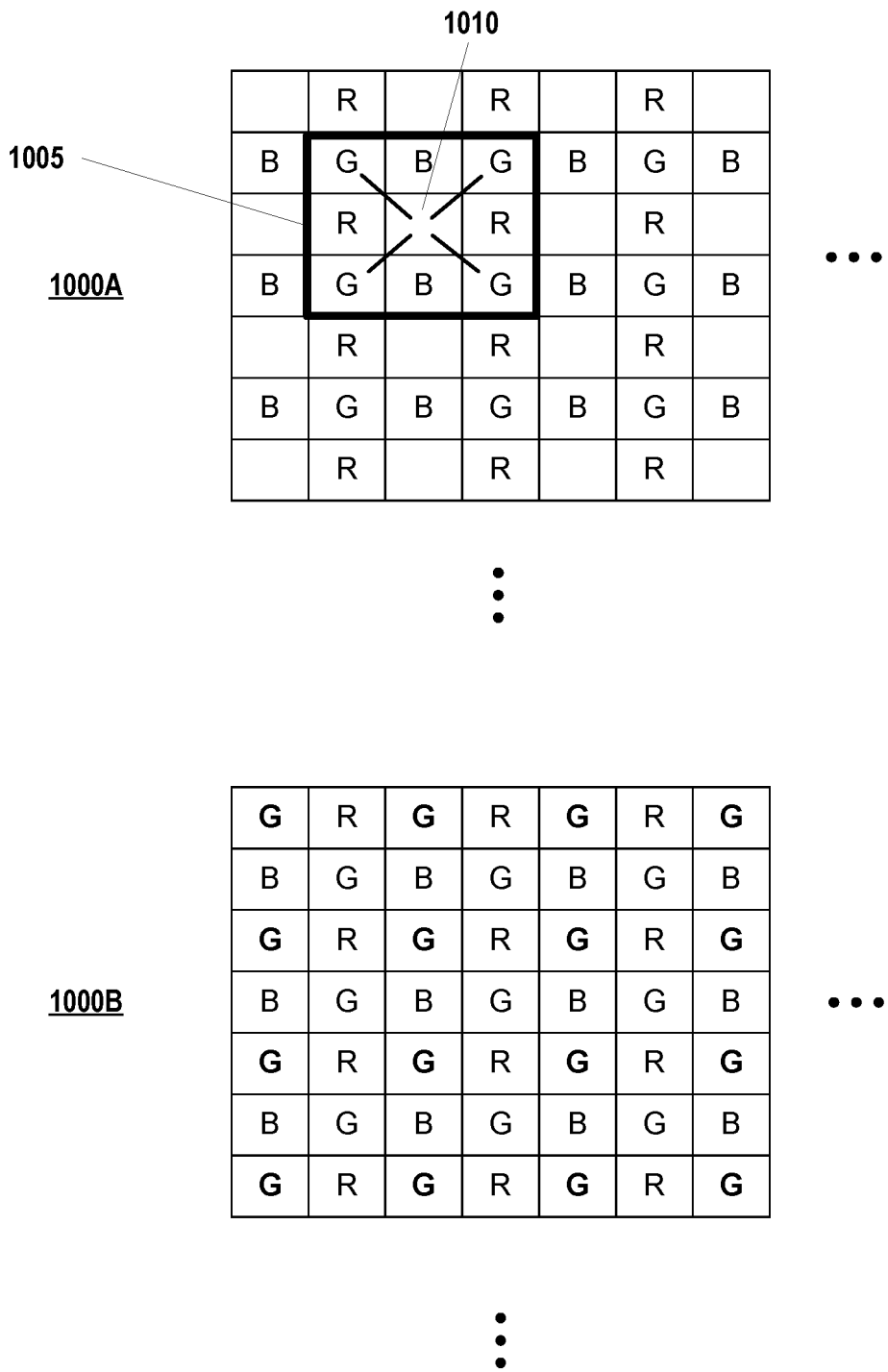
FIG. 10 depicts partial data arrays, according to embodiments of the present document.

It should be noted that any of these methods may be used a filter pattern like that in FIG. 2 and FIG. 3. However, in embodiments, different approaches may be used for a filter pattern such as shown in FIG. 3. FIGS. 9 and 10 depict some examples for estimating missing values for a sensor data array corresponding to a filter pattern type shown in FIG. 3, according to embodiments of the present disclosure.

FIG. 9 depict example methods for estimating infrared values that are missing in a data array from a filter pattern like that shown in FIG. 3, according to embodiments of the present disclosure. As depicted in the partial data array 900A, the red-green-blue values have been removed or not copied so that only the measured IR values exist in the data array. In embodiments, any of the previous methods discussed above may be used. For example, as depicted in FIG. 9, the nearby neighbors of measured IR values may be used. In the depicted example, the neighbors within the neighborhood 905 may be averaged to estimate a value for the missing location 910. Similarly, the neighbors within the neighborhood 915 may be averaged to estimate a value for the missing location 920. The output is an infrared image with a complete set of values as shown in the partial array 900B, in which bolded "IR" represent estimated values.

FIG. 10 depict example methods for estimating non-infrared values that are missing in a data array from a filter pattern like that shown in FIG. 3, according to embodiments of the present disclosure. As depicted in the partial data array 1000A, the infrared values have been removed or not copied so that the measured red-green-blue values exist in the data array. In embodiments, any of the previous methods discussed above may be used. However, in embodiments, there is a choice for which type of value (red, green, or blue) is to be estimated. In embodiments, the missing values may be shared across the three colors based upon some percentage (e.g., 20% Red, 30% Blue, and 50% Green) and they may be positioned to attempt to uniformly distributed the colors. It should also be noted that, in embodiments in which the resolution of the sensor array is higher than that of the filter, such that a cell in the depicted example corresponds to multiple array cells, then blending and filtering can be employed. For example, if cell 1010 actually represents 3×3 cells, then a mix of red-green-blue values may be assigned.

In embodiments, since the human eye is most sensitive to green colors, the missing values may all be assigned to the green color using nearby green values to estimate the value. For example, as depicted in FIG. 10, the nearby neighbors of measured green values within the neighborhood 1005 may be averaged to estimate a value for the missing location 1010. The output is a color image with a complete set of values as shown in the partial array 1000B, in which bolded "G" represent estimated values.

In embodiments, in addition to linear and polynomial interpolation methods, other interpolation methods may also be employed. In embodiments, conditions (such as a condition(s) or rule(s) precedent to deciding values may be used). For example, values of nearby cells may be compared and based upon whether one is higher or lower may determine which interpolation method is used and/or which values are used. In embodiments, different size neighborhoods may be used, differently configured neighborhood may be used. One skilled in the art shall recognize a number of approaches may be used to interpolate values and such approaches fall within the spirit and scope of the current disclosure.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. An imaging system comprising:
   an image sensor comprising an array of sensor cells; and
   a filter comprising at least two types of filters elements comprising:
   an infrared filter type that allows light in an infrared spectrum range to pass through the filter element; and
   at least one non-infrared filter type that allows light in a visible spectrum range to pass through the filter element; and
   the filter comprising a pattern of the infrared filter elements and the non-infrared filter elements and being positioned relative to the sensor cells in the array of sensor cells to form a correspondence between sensor cells and filter elements in the filter to allow for simultaneous capture of an infrared image and visible light image using the same image sensor.

2. The imaging system of claim 1, wherein the at least one non-infrared filter type that allows light in a visible spectrum range to pass through the filter element comprises three distinct non-infrared filter types comprising:
   a red filter type that allows light in a red spectrum range to pass through the filter element;
   a green filter type that allows light in a green spectrum range to pass through the filter element; and
   a blue filter type that allows light in a blue spectrum range to pass through the filter element.

3. The imaging system of claim 1 further comprising:
   a processor unit; and
   a non-transitory computer-readable medium or media comprising one or more sequences of instructions which, when executed by the processor unit, causes steps to be performed comprising:
   capturing an image of a scene using the filter and image sensory;
   converting signals generate by each sensor cell to digitally represented data;
   dividing the digital sensor data into at least two sets comprising with one set comprising the infrared data and the other set comprising the non-infrared data;
   for each set of data, for each element whose value was removed, using one or more nearby values to estimate a value and add that value in the missing location; and
   outputting an IR image and at least one non-infrared image.

4. The imaging system of claim 3 further comprising:
   using the IR image to determine distance information to surfaces in a scene in the image.

5. The imaging system of claim 3 wherein the step of further for each set of data, for each element whose value was removed, using one or more nearby values to estimate a value and add that value in the missing location comprises:
   identifying a set of one or more values within a neighborhood of the missing location that are associated with a filter type; and
   using the set of one or more values within a neighborhood of the missing location that are associated with a filter type to interpolate the value.

6. The image system of claim 1 wherein the filter comprises a set of rows in which:
   a row comprises a repeated pattern of an infrared filter element and a non-infrared filter element; and
   filter elements of the same type are not aligned in consecutive rows.

7. The image system of claim 1 wherein the filter comprises a set of alternating rows comprising:
   a row comprises a repeated pattern of an infrared filter element and a non-infrared filter element of a first type; and
   a row comprises a repeated pattern of a non-infrared filter element of a second type and a non-infrared filter element of a third type.

8. The image system of claim 7 wherein:
   the non-infrared filter element of a first type is a red filter type that allows light in a red spectrum range to pass through the filter element;
   the non-infrared filter element of a second type is a green filter type that allows light in a green spectrum range to pass through the filter element; and
   the non-infrared filter element of a third type is a blue filter type that allows light in a blue spectrum range to pass through the filter element.

9. A method for simultaneous capture of an infrared image and visible light image using a same image sensor array, the method comprising:
   capturing an image of a scene using an image sensor comprising an array of sensor cells and a filter comprising at least two types of filters elements comprising:
   an infrared filter type that allows light in an infrared spectrum range to pass through the filter element; and
   at least one non-infrared filter type that allows light in a visible spectrum range to pass through the filter element; and
   the filter comprising a pattern of the infrared filter elements and the non-infrared filter elements and is positioned relative to the sensor cells in the array of sensor cells to form a correspondence between sensor cells and filter elements in the filter to allow for simultaneous capture of an infrared image and visible light image using the same image sensor;
   converting signals generate by each sensor cell to digitally represented data;
   dividing the digital sensor data into at least two sets comprising with one set comprising the infrared data and the other set comprising the non-infrared data;
   for each set of data, for each element whose value was removed, using one or more nearby values to estimate a value and add that value in the missing location; and
   outputting an infrared image and at least one non-infrared image.

10. The method of claim 9 further comprising:
    using the infrared image to determine distance information to surfaces in the scene in the image.

11. The method of claim 9 wherein the step of further for each set of data, for each element whose value was removed, using one or more nearby values to estimate a value and add that value in the missing location comprises:

identifying a set of one or more values within a neighborhood of the missing location that are associated with a filter type; and using the set of one or more values within a neighborhood of the missing location that are associated with a filter type to interpolate the value.

12. The method of claim 9 wherein the filter comprises a set of rows in which:

a row comprises a repeated pattern of an infrared filter element and a non-infrared filter element; and filter elements of the same type are not aligned in consecutive rows.

13. The method system of claim 9 wherein the filter comprises a set of alternating rows comprising:

a row comprises a repeated pattern of an infrared filter element and a non-infrared filter element of a first type; and a row comprises a repeated pattern of a non-infrared filter element of a second type and a non-infrared filter element of a third type.

14. An imaging system comprising:

an image sensor comprising an array of sensor cells; and a filter comprising at least two types of filters elements comprising:

an infrared filter type that allows light in an infrared spectrum range to pass through the filter element; and at least one non-infrared filter type that allows light in a visible spectrum range to pass through the filter element; and the filter comprising a pattern of the infrared filter elements and the non-infrared filter elements and being positioned relative to the sensor cells in the array of sensor cells to form a correspondence between sensor cells and filter elements in the filter.

15. The imaging system of claim 14, wherein the at least one non-infrared filter type that allows light in a visible spectrum range to pass through the filter element comprises three distinct non-infrared filter types comprising:

a red filter type that allows light in a red spectrum range to pass through the filter element;

a green filter type that allows light in a green spectrum range to pass through the filter element; and a blue filter type that allows light in a blue spectrum range to pass through the filter element.

16. The imaging system of claim 14 further comprising:

a processor unit; and a non-transitory computer-readable medium or media comprising one or more sequences of instructions which, when executed by the processor unit, causes steps to be performed comprising:

capturing an image of a scene using the filter and the image sensor;

converting signals generate by each sensor cell to digitally represented data;

dividing the digital sensor data into at least two sets comprising with one set comprising the infrared data and the other set comprising the non-infrared data;

for each set of data, for each element whose value was removed, using one or more nearby values to estimate a value and add that value in the missing location; and outputting an infrared image and at least one non-infrared image.

17. The imaging system of claim 16 further comprising:

using the infrared image to determine distance information to surfaces in the scene in the image.

18. The imaging system of claim 16 wherein the step of further for each set of data, for each element whose value was removed, using one or more nearby values to estimate a value and add that value in the missing location comprises:

identifying a set of one or more values within a neighborhood of the missing location that are associated with a filter type; and using the set of one or more values within a neighborhood of the missing location that are associated with a filter type to interpolate the value.

19. The image system of claim 14 wherein the filter comprises a set of rows in which:

a row comprises a repeated pattern of an infrared filter element and a non-infrared filter element; and filter elements of the same type are not aligned in consecutive rows.

20. The image system of claim 14 wherein the filter comprises a set of alternating rows comprising:

a row comprises a repeated pattern of an infrared filter element and a non-infrared filter element of a first type; and a row comprises a repeated pattern of a non-infrared filter element of a second type and a non-infrared filter element of a third type.

* * * * *